US008001087B1

(12) United States Patent
Newstadt et al.

(10) Patent No.: US 8,001,087 B1
(45) Date of Patent: Aug. 16, 2011

(54) METHOD AND APPARATUS FOR PERFORMING SELECTIVE BACKUP OPERATIONS BASED ON FILE HISTORY DATA

(75) Inventors: Keith Newstadt, Newton, MA (US); Adam P. Schepis, Milford, MA (US)

(73) Assignee: Symantec Operating Corporation, Mountain Viiew, CA (US)

( * ) Notice: Subject to any disclaimer, the term of this patent is extended or adjusted under 35 U.S.C. 154(b) by 371 days.

(21) Appl. No.: 11/965,092

(22) Filed: Dec. 27, 2007

(51) Int. Cl.
*G06F 17/30* (2006.01)

(52) U.S. Cl. ...................................................... 707/665

(58) Field of Classification Search ........... 707/999.204, 707/640, 665
See application file for complete search history.

(56) References Cited

U.S. PATENT DOCUMENTS

| | | | |
|---|---|---|---|
| 5,649,200 A * | 7/1997 | Leblang et al. ............... | 717/122 |
| 6,044,381 A * | 3/2000 | Boothby et al. ...................... | 1/1 |
| 7,343,364 B2 * | 3/2008 | Bram et al. ...................... | 706/47 |
| 2002/0087883 A1* | 7/2002 | Wohlgemuth et al. ........ | 713/201 |
| 2005/0071390 A1* | 3/2005 | Midgley et al. ............... | 707/204 |
| 2005/0228836 A1* | 10/2005 | Bacastow et al. ............ | 707/204 |
| 2005/0273399 A1* | 12/2005 | Soma et al. ..................... | 705/26 |
| 2006/0218435 A1* | 9/2006 | van Ingen et al. ................ | 714/6 |

* cited by examiner

*Primary Examiner* — James Trujillo
*Assistant Examiner* — Jorge A Casabova
(74) *Attorney, Agent, or Firm* — Campbell Stephenson LLP

(57) ABSTRACT

A method involves generating a business rule; the business rule indicates whether a file should be included in a backup operation. Data is accumulated in a file history database, and the data represents one or more associations of the file. A result is determined, indicating whether the business rule indicates the file should be included in the backup operation. The result is based, at least in part, on the data in the file history database. The result is reported.

20 Claims, 6 Drawing Sheets

METHOD AND APPARATUS FOR PERFORMING SELECTIVE BACKUP OPERATIONS BASED ON FILE HISTORY DATA

BACKGROUND OF THE INVENTION

1. Field of the Invention

This invention relates to data storage systems and, more particularly, to performing backups and restores of data in data storage systems.

2. Description of the Related Art

Backup systems are used to protect data against loss. Typically, a backup system includes software that periodically copies user data to a backup storage device (e.g., such as a tape drive). If data is lost (e.g., due to user error or device failure), the backed-up copy of the data can be retrieved from the backup storage device.

Many organizations implement a network-based backup system in order to ensure that the organization's data is regularly backed up. For example, a company can implement a network-based backup system to ensure that employees' data is backed up on a daily basis. Data that is stored on storage devices connected to the network is then backed up at regular intervals.

A revolutionary growth in the use and distribution of digital media (from audio podcasts to video distribution) now complements the ceaseless growth in digital documents that has persisted for the last decade. Maturation of market models for digital content delivery has enabled the creation of high-value services and products, in which, ever-increasing amounts of digital media are sold to and accumulated by the user. This growth in paid digital content has increased the dollar value of the digital documents stored and retained by the average user, and has thereby increased the demand for backup services.

Unfortunately, the growth in digital content delivery has also created a concomitant growth in the volume of material stored by users, increasing the resources required to perform a backup operation. A large percentage of this volume is composed of what can be called 'incidental material', the preservation of which is of no particular importance to the user. Much of this incidental material may be downloaded for one-time use or temporary viewing, or may be freely available on the Internet, such that current backup operation solutions, which indiscriminately include such incidental material in backup operations, waste resources and impose unnecessary costs.

SUMMARY OF THE INVENTION

Various embodiments of methods and systems for performing selective backup operations based on file history data are disclosed. In one embodiment, a method involves generating a business rule; the business rule indicates whether a file should be included in a backup operation. Data is accumulated in a file history database, and the data represents one or more associations of the file. A result is determined, indicating whether the business rule indicates the file should be included in the backup operation. The result is based, at least in part, on the data in the file history database. The result is reported.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
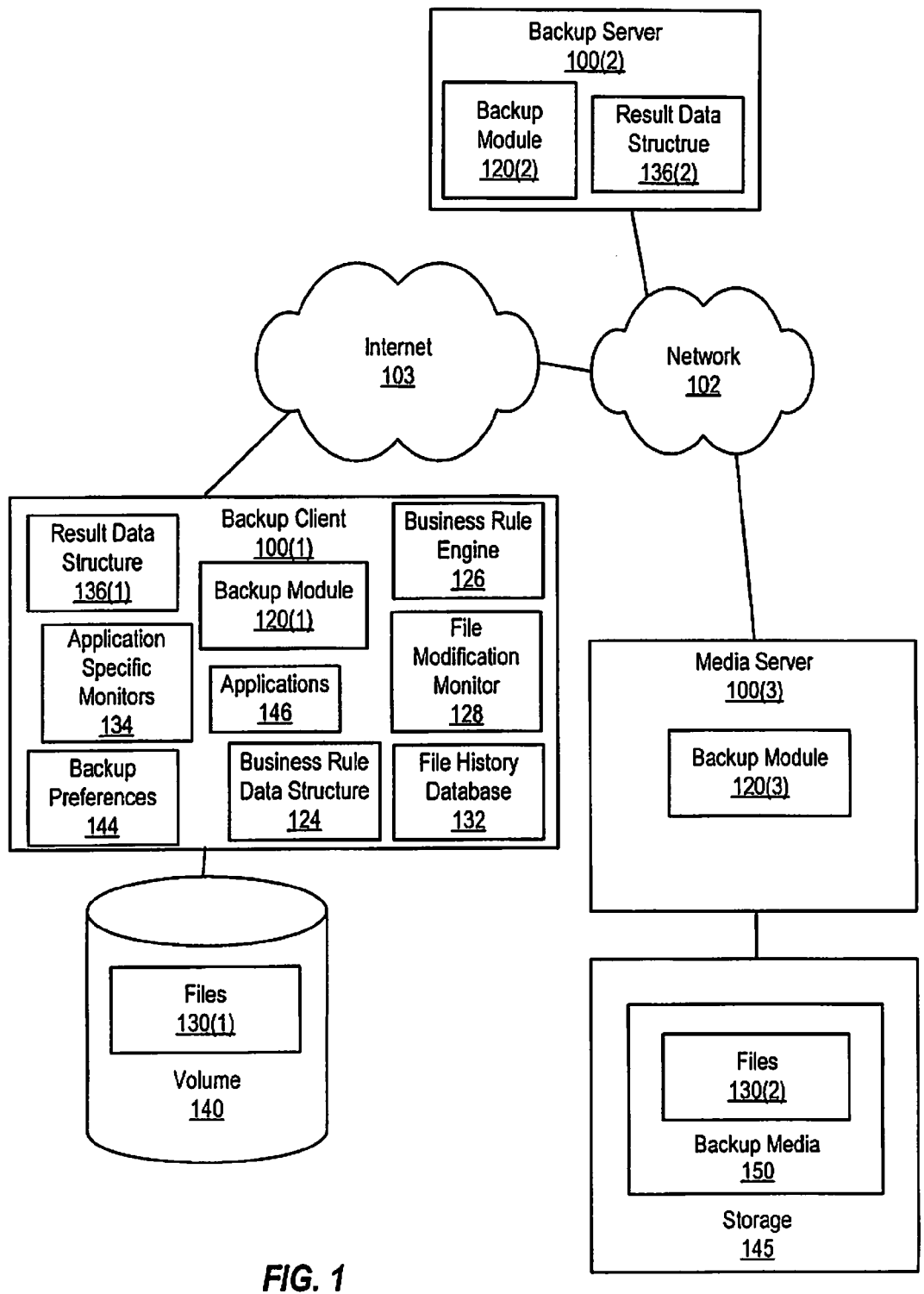
FIG. 1 is a block diagram of a system for performing selective backup operations based on file history data, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a data storage system. The components in FIG. 1 can perform backups, full restores from backups, and selective restores of individual files from backups. FIG. 1 includes a backup client 100(1), a backup server 100(2), and a media server 100(3). Backup server 100(2) and media server 100(3) are coupled by a network 102. Backup client 100(1) can also connect directly to network 102. However, in this example, backup client 100(1) is instead coupled to network 102 by Internet 103. In one embodiment, backup client 100(1) can communicate with backup server 100(2) and media server 100(3) (e.g., using a variety of techniques ranging from FTP and HTTP to email and instant messaging), even though backup client 100(1) does not have direct access to network 102.

Network 102 can include one or more WANs (Wide Area Networks), LANs (Local Area Networks), and/or one or more SANs (Storage Area Networks). Network 102 can include a WAN (Wide Area Network), such as the Internet, one or more LANs (Local Area Networks), and/or one or more SANs (Storage Area Networks). Network 102 can be implemented using various media, including coaxial cables, fiber optic cables, and wireless links. In general, a preferred embodiment of network 102 presents a secure network that allows various computing devices to communicate with each other as well as with the backup system that includes backup server 100(2). Network 102 may implement various security techniques, such as firewall techniques.

As shown, backup client 100(1), backup server 100(2), and media server 100(3) each include backup and restore client software or agents implemented by backup modules 120(1), 120(2), and 120(3). Such agents typically receive instructions from backup server 100(2) and handle the extraction and placement of data for the backup client 100(1). Together, the backup and restore agents can backup and restore information stored on the client system. In one embodiment, backup modules 120(1)-120(3) are implemented using VERITAS NetBackup™ or VERITAS BackupExec™ software, available from Symantec Corporation of Cupertino, Calif.

Backup client 100(1) is coupled to (or, alternatively, includes) a storage device, volume 140. Volume 140 is a physical or logical storage device that stores one or more files 130(1). Volume 140 can include one or more physical storage devices (e.g., in one embodiment, volume 140 is implemented on a storage array that includes several independent hard drives). Applications 146 executing on backup client 100(1) can access (e.g., read and write) files 130(1) stored on volume 140. It is noted that in other embodiments, the information stored on volume 140 could be organized using data objects (e.g., database records, object-based storage, and the like) other than files.

Backup client 100(1) further includes a file modification monitor 128. File modification monitor 128 notes to a file history database 132 details for any operations of applications 146 that involve the creation or modification of files 130(1) on volume 140, thereby creating associations between any of files 130(1) and the applications 146 that have created or modified them. File history database 132 stores creation or modification information for each of a selected set of files 130(1), including the set of applications 146 and users of those applications 146 that have accessed or modified files 130. File history database 132 may also store application specific information provided by application specific monitors 134.

Application specific monitors 134 provide further information in file history database 132 as to why files were created or modified by applications 146 that they monitor. Application specific monitors 134 can also provide information about the content or ownership of a file. In one example, an application specific monitor 134 could provide information to file history database 132 to note that an audio file created by an application 146 contains a song for which the user had paid and can note the website from which it was downloaded.

A business rule engine 126 uses data in file history database 132 and backup preferences 144 to generate a business rule, which in one embodiment is stored in a business rule data structure 124 indicating whether file 130 should be made part of a backup operation by backup module 120. Business rule engine 126 further determines a result, which in some embodiments is reported by direct transmission to backup module 120 and in some embodiments is stored on backup client 100(1) as result data structure 136(1) or stored on backup server 100(2) as result data structure 136(2) and which denotes whether a business rule in business rule data structure 124 indicates that file 130 will be made part of a backup operation. Business rule engine uses backup preferences 144 file history database 132 and file history database to determine whether file 130 should be made part of a backup operation by backup module 120 in a process that attempts to approximate the importance of file 130 to a user.

Backup server 100(2) includes backup module 120(2), which initiates backups of client data. For example, backup module 120(2) can include a user interface that allows an administrator to specify when client data (such as file data 130(1), which is maintained by backup client 100(1)) should be backed up. Backup module 120(2) can also control media server 100(3) and interact with backup client 100(1). In one embodiment, backup module 120(1) stores information received from a user interface in backup preferences 144.

Media server 100(3) implements backup module 120(3), which participates in backup system operations (such as backups and restores) under direction from backup server 120(2). In this example, backup module 120(3) creates a backup by copying information stored on volume 140 to backup media 150 (backup media 150 is part of a pool of storage 145, which can include various types of storage devices, that is accessible to media server 100(3)). As shown, a point-in-time copy (files 130(2)) of files 130(1) can be stored on backup media 150. Backup media 150 can include sequential storage media such as magnetic tape as well as random access media such as hard disk drives, optical disks (e.g., CDs (Compact Discs) and DVDs (Digital Versatile Discs), and the like).

When backup client 100(1) is not directly connected to network 102, backup module 120(1) is configured to send data (e.g., such as all or part of files 130(1)) that is to be backed up to media server 100(3) using techniques a variety of techniques ranging from FTP and HTTP to email and instant messaging. In particular, backup module 120(1) is configured to collect the necessary data and metadata, which describes the data, package the data and metadata, and send the data and metadata to backup module 120(3).

Backup module 120(1) can send messages that contain backup data in response to requests for backup (e.g., as received from a user or from backup server 100(2)). Backup module 120(1) can also send such messages periodically, at prescheduled times, or in response to certain events.

In one embodiment, backup module 120(1) generates and sends the backup information without user assistance. The backup transaction can be transparent to the user of backup client 100(1), such that the user is unaware that the backup module is sending data to the backup server (or vice versa).

It is noted that, in some embodiments, backup client 100(1) will participate in traditional network-based backup techniques whenever backup client 100(1) is directly connected to network 102. In some such embodiments, backup module 120(1) can detect whether backup client 100(1) is directly connected to network 102 and select which type of backup techniques to use dependent upon whether a direct connection to network 102 is present. Similarly, if restores are being performed, backup module 120(3) can detect whether backup client 100(1) is currently present in the network 102.

Figure 2:
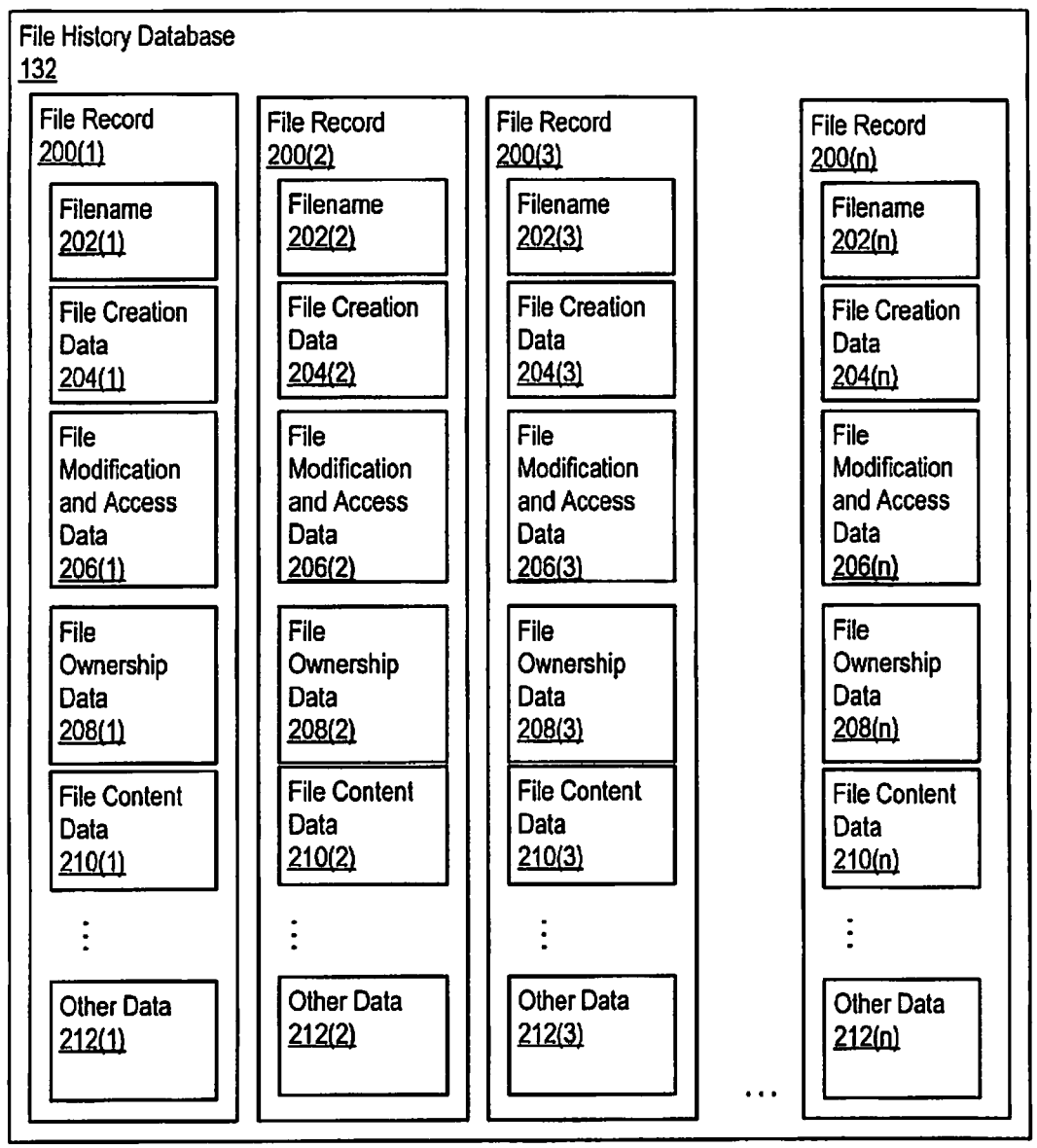
FIG. 2 is a block diagram of a file history database for performing selective backup operations based on file history data, according to one embodiment of the present invention.

Referring now to FIG. 2, a block diagram of an exemplary file history database for performing selective backup operations based on file history data, according to one embodiment of the present invention, is depicted. File history database 132 contains file records 200(1)-200(n). Note that, where the numerical notation (n) is used in the present application, it is provided to indicate a plurality of objects, without necessarily specifying a consistent quantity between different instances of notation (n).

In one embodiment, each file record 200(1)-200(n) is associated with at least one of files 130(1). Each file record 200(1)-200(n) contains a filename 202(1)-202(n), which provides a descriptive identifier of files 130(1), or in some embodiments, other data constructs, to which file record 200(1)-200(n) is associated. In one embodiment, each file record 200(1)-200(n) also contains file creation data 204(1)-204(n), which includes, for example, the time and date of file creation, creating application, and creating user. Each file record 200(1)-200(n) further contains file modification data 206(1)-206(n), which includes, for example, the time and date of file modifications and accesses, modifying and accessing applications, and users modifying and accessing the files 130 covered by file record 200(1)-200(n).

In one embodiment, each file record 200(1)-200(n) also contains file ownership data 208(1)-208(n), which includes, for example, whether a user has paid for or created the content of the files 130 covered by file record 200(1)-200(n). Content of file ownership data 208(1)-208(n) can, in one embodiment, be provided by file modification monitor 128 or application specific monitors 134. As an example of one embodiment, application specific monitors 134 associated with a digital music application among applications 146 could record that a file 130 was purchased from a digital music website. Each file record 200(1)-200(n) also contains file content data 210(1)-210(n), which includes content and format indexing data provided by application specific monitors 134 that can indicate, for example, whether the content of file 130 is music (including, e.g., details of artist and genre), television programs (including, e.g., series title and episode), photographs (including, e.g. tag information), movies (including, e.g. a complete IMDB listing), spreadsheets (including, e.g., keywords or critical formulas) or word processing documents (including, e.g., keywords). Each file record 200(1)-200(n) may also contain other data 212(1)-212(n) as appropriate to a particular embodiment of the present invention.

Figure 3:
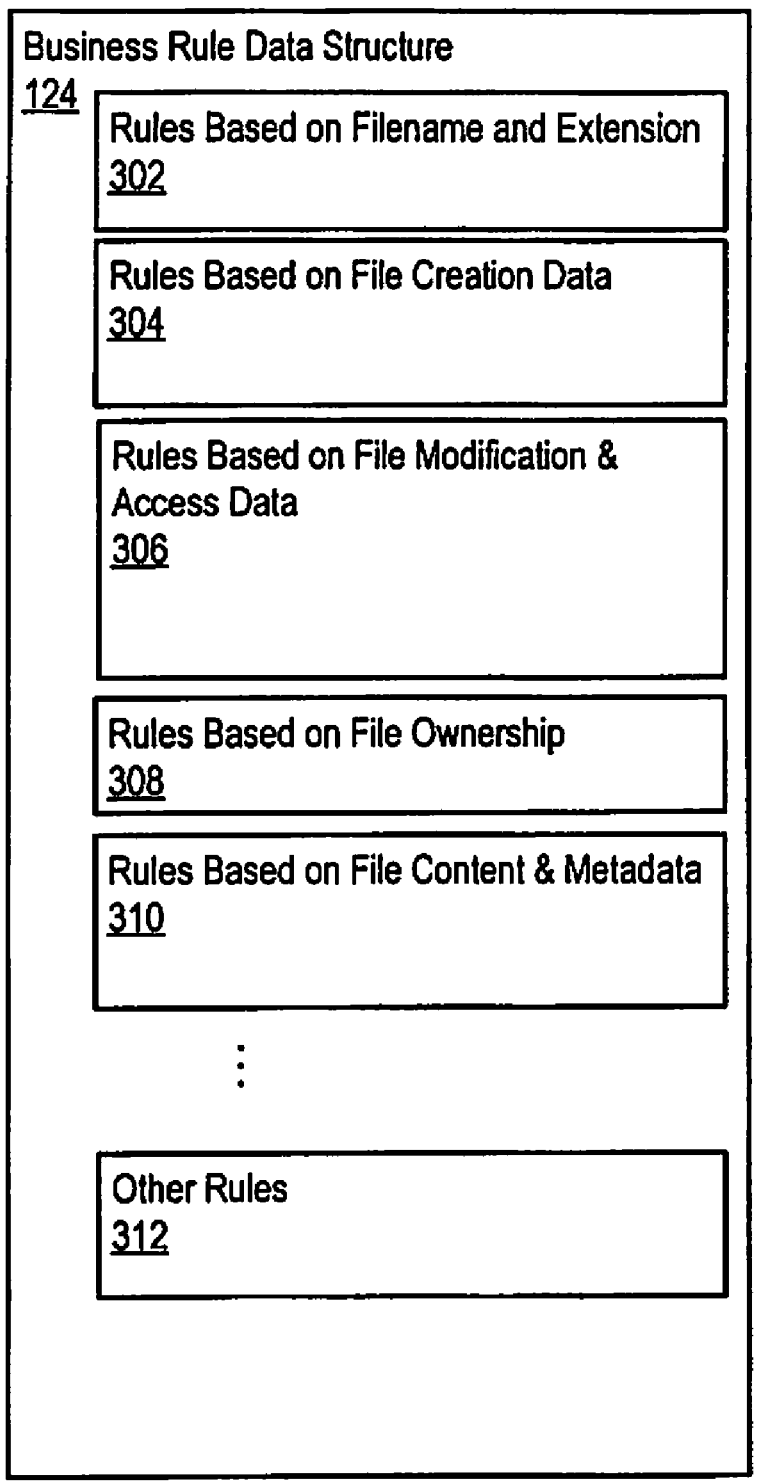
FIG. 3 is a block diagram of a business rule data structure for performing selective backup operations based on file history data, according to one embodiment of the present invention.

Turning now to FIG. 3, a block diagram of a business rule data structure for performing selective backup operations based on file history data, according to one embodiment of the present invention, is illustrated. In one embodiment, business rule data structure 124 is generated from file history database 132 and backup preferences 144 by business rule engine 126. Business rule data structure 124 contains rules for indicating, for determination by business rule engine 126, whether a file 130(1) should be made part of a backup operation by backup module 120(1). In a preferred embodiment, each rule of business rules data structure 124 may provide a rule individually dispositive of the question of whether a file 130 should be made part of a backup operation by backup module 120(1), while alternative embodiments may provide a point value for a scoring system used by business rules engine 126. As an example, rules based on filename and extension 302 indicate the impact of content of filename 202(1)-202(n) of file record 200(1)-200(n) in file history database 132 on whether a file 130(1) should be made part of a backup operation by backup module 120(1).

Likewise, rules based on file creation data 304 indicate the impact of content of file creation data 204(1)-204(n) of file record 200(1)-200(n) on whether a file 130(1) should be made part of a backup operation by backup module 120(1). Rules based on file modification and access data 306 indicate the impact of content of file modification and access data 206(1)-206(n) on whether a file 130(1) should be made part of a backup operation by backup module 120(1). Similarly, rules based on file ownership 308 indicate the impact of content of file ownership data 208(1)-208(n) on whether a file 130(1) should be made part of a backup operation by backup module 120(1).

Rules based on file content data 310 indicate the impact of content of file content data 210(1)-210(n) on whether a file 130(1) should be made part of a backup operation by backup module 120(1). Finally, other rules 312, which will vary between embodiments of the present invention and be based on other data, indicate the impact of content of other data 212(1)-212(n) on whether a file 130(1) should be made part of a backup operation by backup module 120(1).

Figure 4:
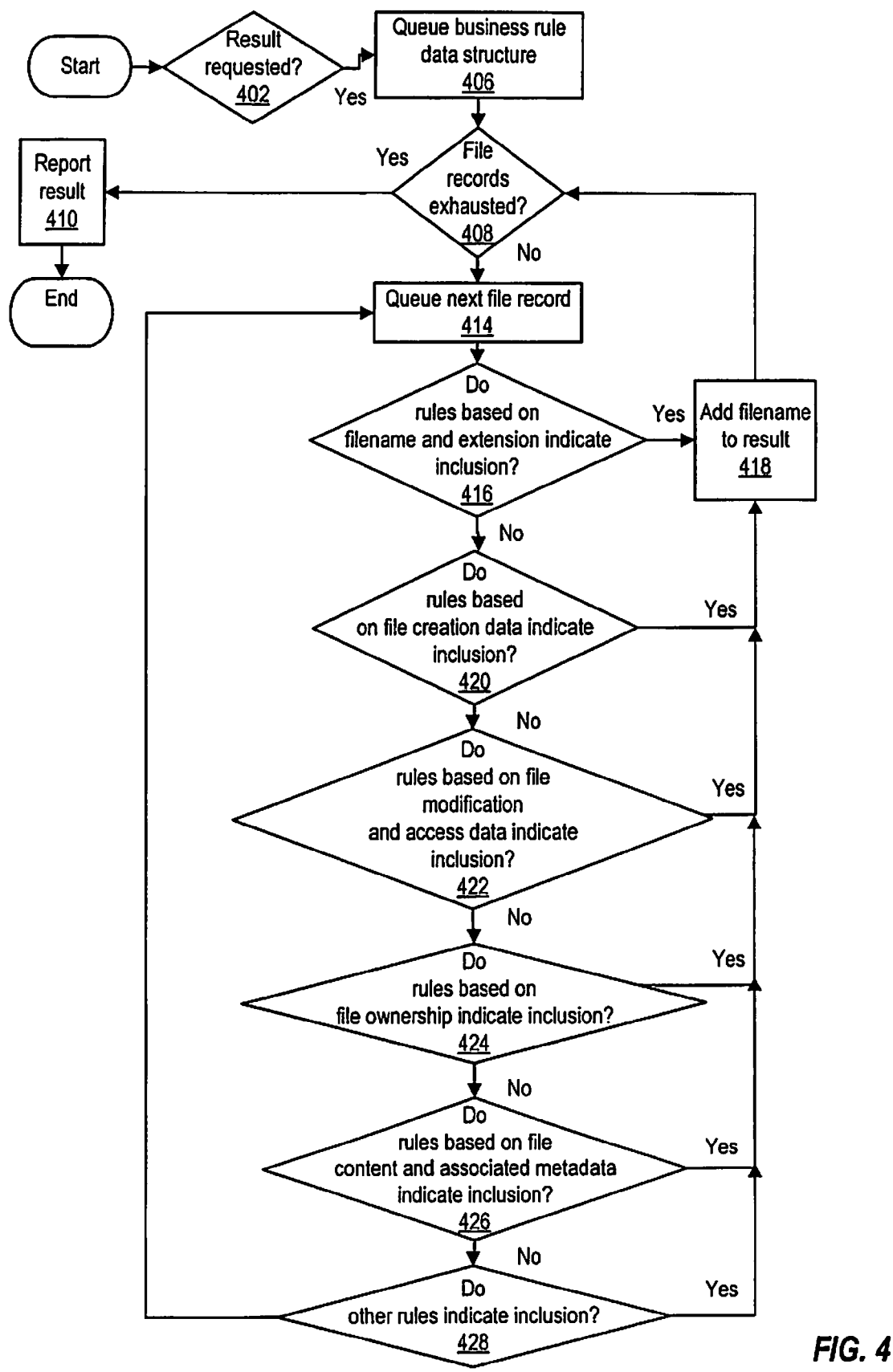
FIG. 4 is a flowchart of one embodiment of a method of selecting files for inclusion, based on file history data, in a selective backup operation.

Referring now to FIG. 4, a flowchart of one exemplary embodiment of a method of selecting files for inclusion, based on file history data, in a selective backup operation is depicted. After a business rule engine 126 determines in step 402 that a result, such as that stored in results data structure 136(1) has been requested by backup engine 120(1), the process then moves to step 406, which illustrates business rule engine 126 queuing business rule data structure 124. The process next proceeds to 408. Step 408 depicts business rule engine 126 determining whether file records 200(1)-200(n) of file history database 132 have been exhausted. If business rule engine 126 determines that file records 200(1)-200(n) of file history database 132 have been exhausted, then the process moves to step 410, which illustrates business rule engine 126 reporting a result. Examples of reporting a result include, but are not limited to, saving result data structure 136(1), transmitting result data structure 136(2) across Internet 103 and network 102 to backup server 100(2), or simply providing a result to backup module 120(1). The process then ends.

Returning to step 408, if business rule engine 126 determines that file records 200(1)-200(n) of file history database 132 have not been exhausted, then the process next proceeds to step 414. Step 414 depicts business rule engine 126 queuing a next file record from among file records 200(1)-200(n) of file history database 132. The process then proceeds to step 416, which illustrates business rule engine 126 determining whether rules based on filename and extension 302 indicate that the file 130(1) represented by the queued file record 200(1)-200(n) in file history database 132 should be made part of a backup operation by backup module 120(1). If business rule engine 126 determines that rules based on filename and extension 302 indicate that the file 130(1) represented by the queued file record 200(1)-200(n) in file history database 132 should be made part of a backup operation by backup module 120(1), then the process moves to step 418. Step 418 depicts business rule engine 126 adding the filename 202(1)-202(n) for the queued file record 200(1)-200(n) in file history database 132 to a result, such as result data structure 136(1). The process then returns to step 408, which is described above.

Returning to step 416, if business rule engine 126 determines that rules based on filename and extension 302 do not indicate that the file 130(1) represented by the queued file record 200(1)-200(n) in file history database 132 should be made part of a backup operation by backup module 120(1), then the process moves to step 420, which illustrates business rule engine 126 determining whether rules based on file creation data 304 indicate that the file 130(1) represented by the queued file record 200(1)-200(n) in file history database 132 should be made part of a backup operation by backup module 120(1). If business rule engine 126 determines that rules based on file creation data 304 indicate that the file 130(1) represented by the queued file record 200(1)-200(n) in file history database 132 should be made part of a backup operation by backup module 120(1), then the process moves to step 418, which is described above.

Returning to step 420, if business rule engine 126 determines that rules based on file creation data 304 do not indicate that the file 130 represented by the queued file record 200(1)-200(n) in file history database 132 should be made part of a backup operation by backup module 120, then the process moves to step 422, which illustrates business rule engine 126 determining whether rules based on file modification and access data 306 indicate that the file 130(1) represented by the queued file record 200(1)-200(n) in file history database 132 should be made part of a backup operation by backup module 120(1). If business rule engine 126 determines that rules based on file modification and access data 306 indicate that the file 130(1) represented by the queued file record 200(1)-200(n) in file history database 132 should be made part of a backup operation by backup module 120(1), then the process moves to step 418, which is described above.

Returning to step 422, if business rule engine 126 determines that rules based on file modification and access data 306 do not indicate that the file 130(1) represented by the queued file record 200(1)-200(n) in file history database 132 should be made part of a backup operation by backup module 120(1), then the process moves to step 424, which illustrates business rule engine 126 determining whether rules based on rules based on file ownership 308 indicate that the file 130(1) represented by the queued file record 200(1)-200(n) in file history database 132 should be made part of a backup operation by backup module 120(1). If business rule engine 126 determines that rules based on file ownership 308 indicate that the file 130(1) represented by the queued file record 200(1)-200(n) in file history database 132 should be made part of a backup operation by backup module 120(1), then the process moves to step 418, which is described above.

Returning to step 424, if business rule engine 126 determines that rules based on file ownership 308 do not indicate that the file 130 represented by the queued file record 200(1)-200(n) in file history database 132 should be made part of a backup operation by backup module 120, then the process moves to step 426, which illustrates business rule engine 126 determining whether rules based on rules based on file content and metadata 310 indicate that the file 130(1) represented by the queued file record 200(1)-200(n) in file history database 132 should be made part of a backup operation by backup module 120(1). If business rule engine 126 determines that rules based on file content and metadata 310 indicate that the file 130(1) represented by the queued file record 200(1)-200(n) in file history database 132 should be made part of a backup operation by backup module 120(1), then the process moves to step 418, which is described above.

Returning to step 426, if business rule engine 126 determines that rules based on file content and metadata 310 do not indicate that the file 130(1) represented by the queued file record 200(1)-200(n) in file history database 132 should be made part of a backup operation by backup module 120(1), then the process moves to step 428, which illustrates business rule engine 126 determining whether other rules 312 indicate that the file 130 represented by the queued file record 200(1)-200(n) in file history database 132 should be made part of a backup operation by backup module 120. If business rule engine 126 determines that other rules 312 indicate that the file 130(1) represented by the queued file record 200(1)-200(n) in file history database 132 should be made part of a backup operation by backup module 120(1), then the process moves to step 418, which is described above. Returning to step 428, if business rule engine 126 determines that other rules 312 do not indicate that the file 130(1) represented by the queued file record 200(1)-200(n) in file history database 132 should be made part of a backup operation by backup module 120(1), then the process moves to step 414, which is described above.

Figure 5:
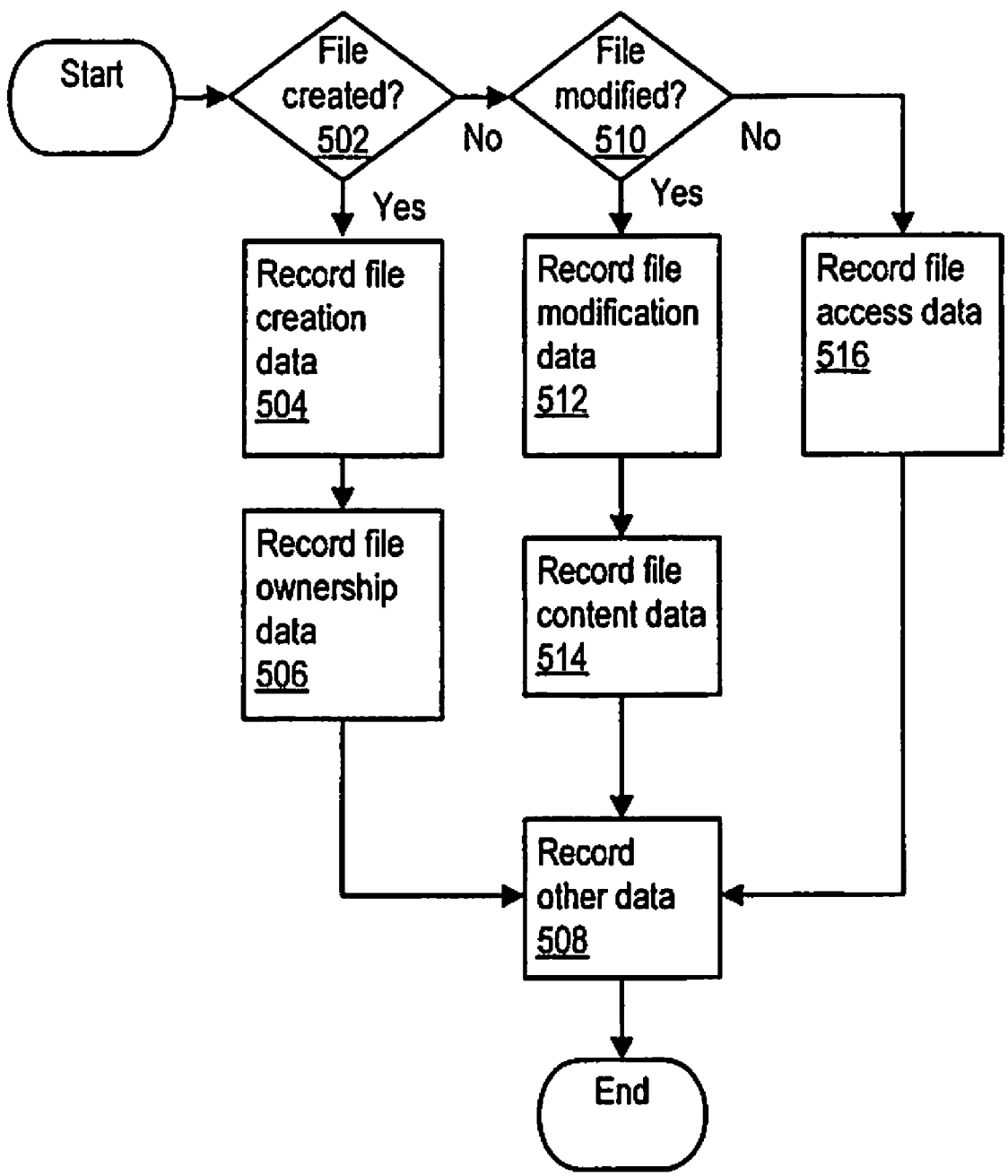
FIG. 5 is a flowchart of one embodiment of a method for accumulating data in a file history database in accordance with a method for performing selective backup operations based on file history data.

Turning now to FIG. 5, a flowchart of one embodiment of a method for accumulating data in a file history database in accordance with a method for performing selective backup operations based on file history data, is depicted. The process depicted in FIG. 5 may be implemented, in an exemplary embodiment, by application specific monitors 134, file modification monitor 128, or similar components integrated into backup module 120(1). Upon starting, the process proceeds to step 502, which illustrates file modification monitor 128 determining whether a new file 130(1) has been created. If file modification monitor 128 determines that a new file 130(1) has been created, the process next moves to step 504. Step 504 illustrates file modification monitor 128 recording a filename 202(1)-202(n) and file creation data 204(1)-204(n) in file record 200(1)-200(n) of file history database 132. The process then proceeds to step 506, which depicts application specific monitors 134 recording file ownership data 208(1)-208(n) in file record 200(1)-200(n) of file history database 132. The process next moves to step 508, which illustrates file modification monitor 128 recording other data 212(1)-221(n), which will vary between embodiments of the present invention, in file record 200(1)-200(n). The process then ends.

Returning to step 502, if file modification monitor 128 determines that a new file has not been created, the process next moves to step 510. Step 510 depicts file modification monitor 128 determining whether an existing file 130(1) has been modified. If file modification monitor 128 determines that an existing file 130(1) has been modified, the process then proceeds to step 512, which illustrates file modification monitor 128 recording file modification data 206(1)-206(n) in file record 200(1)-200(n) of file history database 132. The process next moves to step 514. Step 514 depicts file modification monitor 128 recording file content data 210(1)-210(n) in file record 200(1)-200(n) of file history database 132. The process then proceeds to step 508, which is described above.

Returning to step 510, if file modification monitor 128 determines that an existing file 130(1) has not been modified, the process then proceeds to step 516. Step 516 illustrates file modification monitor 128 recording file access data 206(1)-206(n) in file record 200(1)-200(n) of file history database 132. The process then proceeds to step 508, which is described above.

Figure 6:
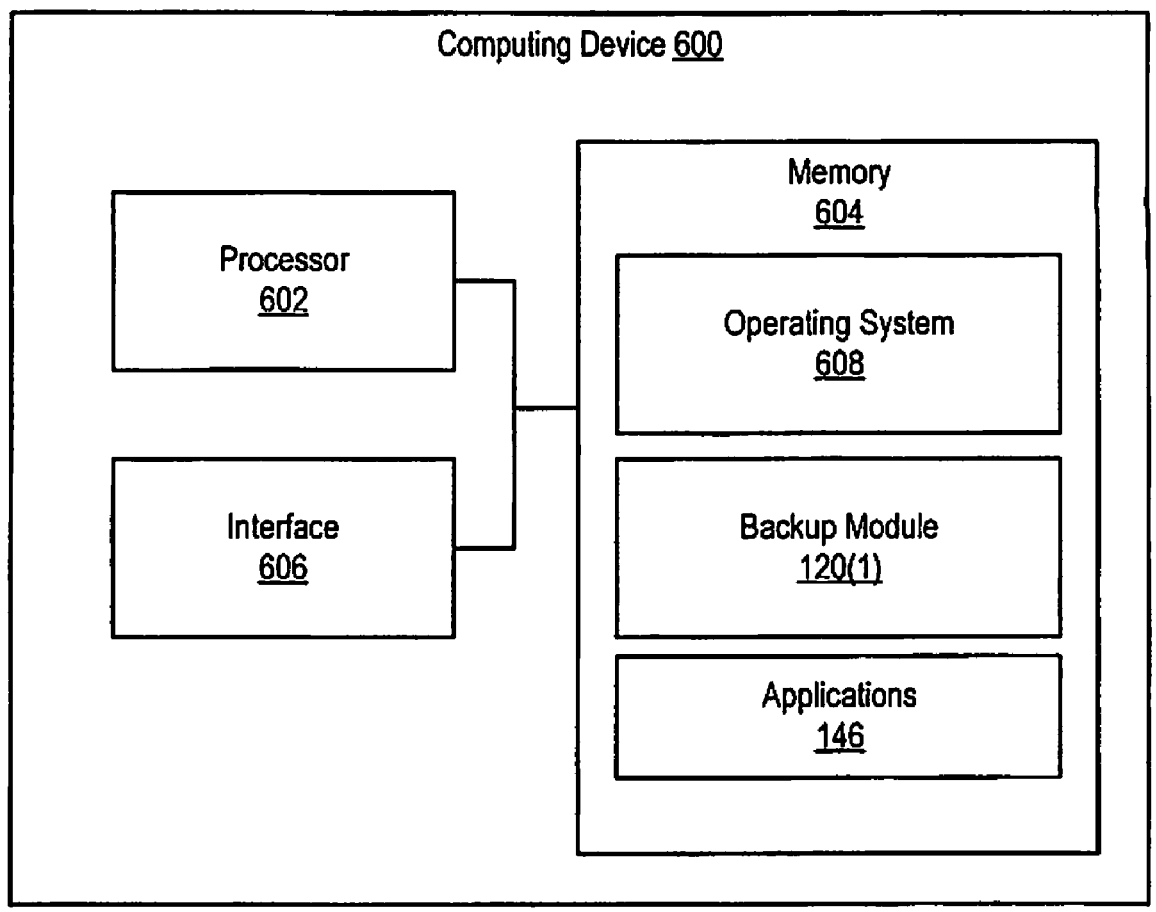
FIG. 6 is a block diagram of a computer system configured for performing selective backup operations based on file history data, according to one embodiment of the present invention.

FIG. 6 is a block diagram of a computing device 600 that implements a backup module 120(1) (e.g., one of backup modules 120(1)-120(3) of FIG. 1) that can participate in backups and restores including selective backup operations based on file history data, according to one embodiment of the present invention. Computing device 600 can implement backup client 100(1) or media server 100(3) of FIG. 1. It is noted that, in at least some embodiments, business rule engine 126 is integrated with backup module 120(1).

As illustrated, computing device 600 includes one or more processors 602 (e.g., microprocessors, PLDs (Programmable Logic Devices), or ASICs (Application Specific Integrated Circuits)) configured to execute program instructions stored on or in a computer-readable medium such as memory 604. Memory 604 can include various types of RAM (Random Access Memory), ROM (Read Only Memory), Flash memory, MEMS (Micro Electro-Mechanical Systems) memory, and the like. Computing device 600 also includes one or more interfaces 606. Processor 602, memory 604, and interface 606 are coupled to send and receive data and control signals by a bus or other interconnect.

Interface(s) 606 can include an interface to a storage device on which information to be backed up or restored is stored. Interface(s) 606 can also include an interface to a network (e.g., network 102 or Internet 103 of FIG. 1) for use in communicating with a server.

The program instructions and data implementing backup module 120(1), applications 146 and operating system 608 can be stored on various computer readable media such as memory 604. In some embodiments, such software is stored on a computer readable medium such as a CD (Compact Disc), DVD (Digital Versatile Disc), hard disk, optical disk, tape device, floppy disk, and the like). In order be executed by processor 602, the instructions and data implementing backup module 120 are loaded into memory 604 from the other computer readable medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, said method comprising:
   generating a business rule, wherein
      said business rule indicates whether a file should be included in a backup operation,
      storing said business rule in a business rules data structure,
      said business rule is configured to use first data and second data,
      said first data is captured by a file modification monitor, and
      said second data is captured by an application specific monitor;
   accumulating data in a file history database, wherein
      said data represents one or more associations between said file and one or more applications configured to access said file,
      said data comprises a plurality of file records corresponding to a respective plurality of files,
      said first data and said second data are included in a first file record of said plurality of file records;
   determining a result indicating whether said file should be included in said backup operation, wherein
      said determining said result comprises
         obtaining said business rule by accessing said business rules data structure,
         retrieving said data from said file history database, and
         determining an importance of said file to a user by evaluating said data using said business rule, and
      said result is based, at least in part, on said importance; and
   reporting said result.

2. The method of claim 1, further comprising, responsive to said result indicating said file should be included in said backup operation, including said file in said backup operation.

3. The method of claim 1, wherein said accumulating further comprises:
   causing said file modification monitor to note in an entry of said file history database a creation association between said file and an application that created said file; and
   causing said file modification monitor to note in an entry of said file history database a modification association indicating a time stamp, the user, and an application that modified said file.

4. The method of claim 1, wherein said accumulating further comprises said application specific monitor noting in an entry of said file history database a purchase association indicating said file contains purchased content.

5. The method of claim 1, wherein said generating further comprises allowing a user to enter preferences for said business rule.

6. The method of claim 1, wherein said reporting further comprises signaling to a backup module.

7. The method of claim 1, wherein said determining said importance of said file comprises:
   calculating a score for said file based on a point value used by said business rule, wherein said score indicates said importance; and
   including said file in said backup operation if said score indicates said file is sufficiently important.

8. The method of claim 1, wherein said determining said importance of said file comprises:
   sequentially evaluating a plurality of business rules.

9. The method of claim 1, further comprising:
   storing said result in a results database, wherein
      said results database comprises a plurality of results associated with a respective plurality of files.

10. A computer program product in a computer-readable storage medium, said computer program product comprising:
    a computer-readable storage medium,
    storing instructions on the computer-readable storage medium for generating a business rule, wherein said business rule indicates whether a file should be included in a backup operation,
    said business rule is stored in a business rules data structure,
    said business rule is configured to use first data and second data,
    said first data is captured by a file modification monitor, and
    said second data is captured by an application specific monitor;
    instructions on the computer-readable storage medium for accumulating data in a file history database, wherein
       said data represents one or more associations between said file and one or more applications configured to access said file,
       said data comprises a plurality of file records corresponding to a respective plurality of files,
       said first data and said second data are included in a first file record of said plurality of file records;
    instructions on the computer-readable storage medium for determining a result indicating whether said file should be included in said backup operation, wherein said determining said result comprises
       obtaining said business rule by accessing said business rules data structure,
       retrieving said data from said file history database, and
       determining an importance of said file to a user by evaluating said data using said business rule, and
       said result is based, at least in part, on said importance; and
    instructions on the computer-readable storage medium for reporting said result.

11. The computer program product in a computer-readable storage medium of claim 10, further comprising, instructions on the computer-readable storage medium for, responsive to said result indicating said file should be included in said backup operation, including said file in said backup operation.

12. The computer program product in a computer-readable storage medium of claim 10, wherein said instructions on the computer-readable storage medium for accumulating further comprise
    instructions on the computer-readable storage medium for said file modification monitor noting in an entry of said file history database a creation association between said file and an application that created said file, and instructions on the computer-readable storage medium for said file modification monitor noting in an entry of said file history database a modification association indicating a time stamp, a user, and an application that modified said file.

13. The computer program product in a computer-readable storage medium of claim 10, wherein said instructions on the computer-readable storage medium for accumulating further comprise instructions on the computer-readable storage medium for said application specific monitor noting in an entry of said file history database a purchase association indicating said file contains purchased content.

14. The computer program product in a computer-readable storage medium of claim 10, wherein said instructions on the computer-readable storage medium for generating further comprise instructions on the computer-readable storage medium for allowing a user to enter preferences for said business rule.

15. The computer program product in a computer-readable storage medium of claim 10, wherein said instructions on the computer-readable storage medium for reporting further comprise instructions on the computer-readable storage medium for signaling to a backup module.

16. An apparatus, said apparatus comprising:
a processor;
means for causing said processor to generate a business rule, wherein
    said business rule indicates whether a file should be included in a backup operation,
    said business rule is stored in a business rules data structure,
    said business rule is configured to use first data and second data,
    said first data is captured by a file modification monitor, and
    said second data is captured by an application specific monitor;
means for accumulating data in a file history database, wherein
    said data represents one or more associations between said file and one or more applications configured to access said file,
    said data comprises a plurality of file records corresponding to a respective plurality of files,
    said first data and said second data are included in a first file record of said plurality of file records;
means for determining a result indicating whether said file should be included in said backup operation, wherein said determining said result comprises
    obtaining said business rule by accessing said business rules data structure,
    retrieving said data from said file history database, and
    determining an importance of said file to a user by evaluating said data using said business rule, and
    said result is based, at least in part, on said importance; and
means for reporting said result.

17. The apparatus of claim 16, further comprising, means for, responsive to said result indicating said file should be included in said backup operation, including said file in said backup operation.

18. The apparatus of claim 16, wherein said means for accumulating further comprises
    means for said file modification monitor noting in an entry of said file history database a creation association between said file and an application that created said file, and
    means for said file modification monitor noting in an entry of said file history database a modification association indicating a time stamp, a user, and an application that modified said file.

19. The apparatus of claim 16, wherein said means for accumulating further comprises means for said application specific monitor noting in an entry of said file history database a purchase association indicating said file contains purchased content.

20. The apparatus of claim 16, wherein said means for generating further comprises means for allowing a user to enter preferences for said business rule.

* * * * *